United States Patent
Chauvin

(10) Patent No.: US 10,956,657 B1
(45) Date of Patent: Mar. 23, 2021

(54) APPARATUS, SYSTEM AND METHOD FOR DOMAIN-SPECIFIC TEXT SCALING CONTROL

(71) Applicant: ALLSCRIPTS SOFTWARE, LLC, Chicago, IL (US)

(72) Inventor: George A. Chauvin, Ferrisburgh, VT (US)

(73) Assignee: ALLSCRIPTS SOFTWARE, LLC, Chicago, IL (US)

( * ) Notice: Subject to any disclaimer, the term of this patent is extended or adjusted under 35 U.S.C. 154(b) by 0 days.

(21) Appl. No.: 16/183,680

(22) Filed: Nov. 7, 2018

(51) Int. Cl.
*G06F 17/00* (2019.01)
*G06F 3/048* (2013.01)
*G06F 40/109* (2020.01)
*G06F 3/0484* (2013.01)
*G06F 3/0481* (2013.01)

(52) U.S. Cl.
CPC .......... *G06F 40/109* (2020.01); *G06F 3/0481* (2013.01); *G06F 3/0484* (2013.01)

(58) Field of Classification Search
CPC ..... G06Q 30/02; G06F 17/214; G06F 40/109; G06F 3/0481; G06F 40/14
USPC .......................... 715/269, 200, 234, 800–801
See application file for complete search history.

(56) References Cited

U.S. PATENT DOCUMENTS

| | | | | |
|---|---|---|---|---|
| 7,430,712 B2* | 9/2008 | Arokiaswamy | ....... | G06F 16/972 715/234 |
| 7,587,474 B2* | 9/2009 | O'Donnell | ............. | G06Q 10/02 709/220 |
| 7,685,160 B2* | 3/2010 | Horvitz | ............. | G06Q 30/0256 707/999.107 |
| 7,768,536 B2* | 8/2010 | Hyatt | .................... | G06F 3/0481 345/619 |
| 8,056,014 B2* | 11/2011 | Brockway | ............. | G06F 16/958 715/788 |
| 8,949,721 B2* | 2/2015 | Bakalov | ................ | G06F 16/954 715/742 |
| 2005/0283739 A1* | 12/2005 | Mohr | .................... | G06F 3/0481 715/800 |
| 2006/0117255 A1* | 6/2006 | Seeler | ................... | G06F 40/106 715/246 |

(Continued)

OTHER PUBLICATIONS

Google, Google Maps Embed API, published Nov. 7, 2017 via waybackmachine, developers.google.com, pp. 1-8 (pdf).*

(Continued)

*Primary Examiner* — Manglesh M Patel
(74) *Attorney, Agent, or Firm* — Loza & Loza LLP; Peter Zura

(57) ABSTRACT

Technologies and techniques for providing domain-specific text scaling for a page having a plurality of domains. A processing apparatus configured to generate the page and an interface associated with at least one of the plurality of domains. A profile module is configured to store user identification information. A scaling module is included, wherein the processing apparatus is configured to receive an input via the interface to modify the text scaling via the scaling module for the associated domain, without modifying the text scaling for at least one of the other of plurality of domains. Contexts for domains may also be determined and subsequently used to load pre-stored values for domain-specific text scaling.

16 Claims, 9 Drawing Sheets

(56) References Cited

U.S. PATENT DOCUMENTS

| | | | |
|---|---|---|---|
| 2006/0244768 A1* | 11/2006 | Witwer | G06F 16/9535 345/661 |
| 2015/0212694 A1* | 7/2015 | Ho | G06F 16/95 715/800 |
| 2015/0269126 A1* | 9/2015 | Hepper | G06F 17/2235 715/238 |
| 2016/0335740 A1* | 11/2016 | Graf | G06F 3/0481 |

OTHER PUBLICATIONS

Emanuel Kluge, Scaling iFrames with CSS transforms, published Nov. 2, 2014, Codepen, pp. 1-3 (pdf) via screencapture.*

* cited by examiner

APPARATUS, SYSTEM AND METHOD FOR DOMAIN-SPECIFIC TEXT SCALING CONTROL

FIELD OF TECHNOLOGY

The present disclosure is directed to technologies and techniques for text scaling. More specifically, the present disclosure is directed to technologies and techniques for controlling text scaling in domain-specific environments.

BACKGROUND

Text scaling has become an important technology for allowing users to specify the size of text rendered or generated on a page or document. Recently the Web Content Accessibility Guidelines (WCAG) have specified methods for making content presented via a web or software applications accessible for people with varying degrees of visual impairment. One of the guidelines, specified in the WCAG 2.0 Level AA specification advises web sites and applications to allow users to manually resize screen text to fit their needs. Specifically the guidelines state that, except for captions and images of text, text can be resized without assistive technology up to 200 percent without loss of content or functionality.

Currently, text scaling is primarily configured to be applied to an entire page, with limited or no ability to apply text scaling only to a select number of domains within the page. Additionally, technologies and techniques are required to allow processing devices to determine domain contexts for a user and to store them for future use for automatically loading domain-specific text scaling.

SUMMARY

Various apparatus, systems and methods are disclosed herein relating to domain-specific text scaling.

In one example, a system and apparatus are disclosed for providing domain-specific text scaling for a page comprising a plurality of domains, comprising a processing apparatus configured to generate the page comprising the plurality of domains, wherein the processing apparatus is further configured to generate an interface associated with at least one of the plurality of domains; a memory device, operatively coupled to the processing apparatus; communications circuitry, operatively coupled to the processing apparatus, wherein the communications circuitry is configured to communicate with a computer network; a profile module, operatively coupled to the processing apparatus, wherein the profile module is configured to store user identification information; a scaling module, operatively coupled to the processing apparatus, wherein the processing apparatus is configured to receive an input via the interface to modify the text scaling via the scaling module for the associated domain, without modifying the text scaling for at least one of the other of plurality of domains.

In another example, a processor-based method is disclosed for providing domain-specific text scaling for a page comprising a plurality of domains, comprising: generating, via a processing apparatus, the page comprising the plurality of domains; generating, via the processing apparatus, an interface associated with at least one of the plurality of domains; storing, via a profile module, user identification information; receiving an input via the generated interface; modifying, via a text scaling module, the text scaling for the associated domain, without modifying the text scaling for at least one of the other of plurality of domains.

In another example, a system and apparatus are disclosed for providing domain-specific text scaling for a page comprising a plurality of domains, comprising: a processing apparatus configured to generate the page comprising the plurality of domains; a memory device, operatively coupled to the processing apparatus; communications circuitry, operatively coupled to the processing apparatus, wherein the communications circuitry is configured to communicate with a computer network; a profile module, operatively coupled to the processing apparatus, wherein the profile module is configured to store user identification information and user context information comprising domain characteristic data and domain-specific text scaling data; a scaling module, operatively coupled to the processing apparatus, wherein the processing apparatus is configured to process the user context information to generate a first context value; and process the generated page to determine a second context value for at least one domain of the page; compare the second context value with the first context value, and, if the values match within a predetermined tolerance value, load a predetermined text scaling value for the domain associated with the second context value for modifying the text scale.

BRIEF DESCRIPTION OF THE FIGURES

The present invention is illustrated by way of example and not limitation in the figures of the accompanying drawings, in which like references indicate similar elements and in which.

DETAILED DESCRIPTION

Various embodiments will be described herein below with reference to the accompanying drawings. In the following description, well-known functions or constructions are not described in detail since they may obscure the invention in unnecessary detail.

It will be understood that the structural and algorithmic embodiments as used herein does not limit the functionality to particular structures or algorithms, but may include any number of software and/or hardware components. In general, a computer program product in accordance with one embodiment comprises a tangible computer usable medium (e.g., hard drive, standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via C, C++, C#, Java, Actionscript, Swift, Objective-C, Javascript, CSS, XML, etc.). Furthermore, the term "information" as used herein is to be understood as meaning digital information and/or digital data, and that the term "information" and "data" are to be interpreted as synonymous.

In addition, while conventional hardware components may be utilized as a baseline for the apparatuses and systems disclosed herein, those skilled in the art will recognize that the programming techniques and hardware arrangements disclosed herein, embodied on tangible mediums, are configured to transform the conventional hardware components into new machines that operate more efficiently (e.g., providing greater and/or more robust data, while using less processing overhead and/or power consumption) and/or provide improved user workspaces and/or toolbars for human-machine interaction.

Figure 1:
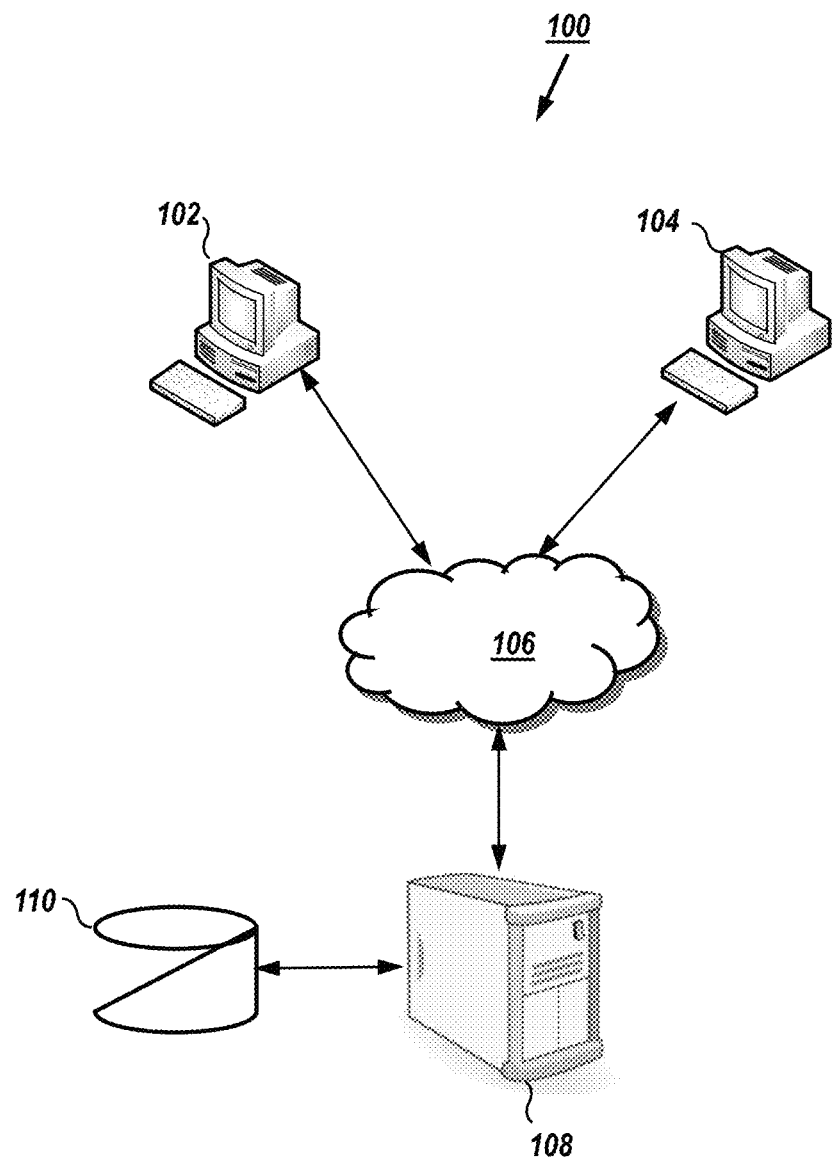
FIG. 1 illustrates a simplified overview of a processor-based computer system configured to perform domain-specific text scaling control under an illustrative embodiment.

Turning to FIG. 1, a system 100 is shown for performing domain-specific text scaling control under an illustrative embodiment. The system 100 may comprise one or more computing devices (102, 104), which may be workstations, personal computers (PCs), laptops, tablets, etc., that are coupled to a computer network 106. Server 108 may also be coupled to the network 106 and communicate with any of computing devices 102, 104. While only two computing devices are shown in the figure, those skilled in the art will recognize that any number of suitable computing devices may be coupled to network 106. Similarly, server 108 may be configured as a stand-alone server, or may be part of a server network that includes a plurality of server, or a cloud server network. Server 108 may be coupled to a central storage database 110, that stores data associated with user profiles, scaling data, domain data. As will be explained in further detail below, the data from database 110, and/or data from computing devices 102, 104 may be processed to provide domain-specific text scaling control.

Figure 2:
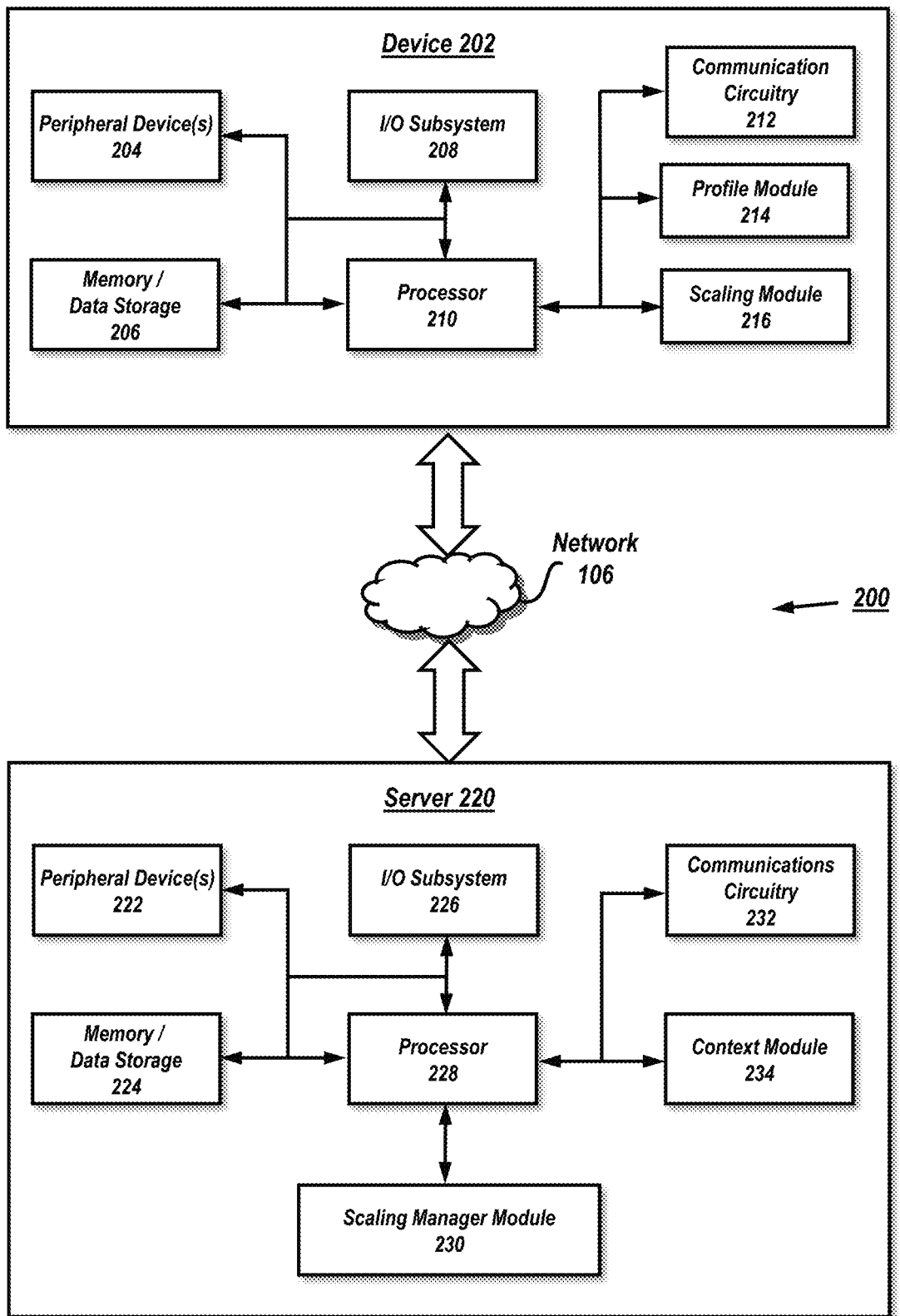
FIG. 2 schematically illustrates an operating environment for processing devices and a server communicatively coupled to a network for performing domain-specific text scaling control under an illustrative embodiment.

FIG. 2 shows an operating environment for system 200 that includes a processing device 202, which may be configured as any of computer devices 102, 104, and a server 220, which may be configured as server 108, communicating via the network 106, wherein the system is configured to provide domain-specific text scaling control under an illustrative embodiment. In the illustrative embodiment, the processing device 202 includes a processor 210 or processor circuit, one or more peripheral devices 204, memory/data storage 206, communication circuitry 212, an profile module 214, and scaling module 216. Profile module 214 may be configured to store user profiles that include, but are not limited to, user identification (ID), previous text scaling settings for specific domains, domain information, application information and computer settings.

Scaling module 216 is configured to use settings (e.g., from profile module 214) and/or manually inputter scaling data to scale text within individual domains on an application page. For the purposes of this disclosure, a "domain" may refer to a portion of a page, such as an application page and/or web page, where the portion may be a page container and/or servlet. The page will include rendered (i.e., generated) data, such as textual information. Additionally, the page may contain rendered non-textual information, such as static images (e.g., raster graphics, typically GIF, JPEG or PNG) and/or or vector formats such as SVG or Flash. The page may also contain animated images, such as animated GIF and SVG, Flash, Shockwave, or Java applet. Additionally, audio (e.g., MP3, Ogg, etc.), video (e.g., Windows media (WMV), Real Media (RM), Flash Video (FLV), MPG, Quick Time (MOV), etc.) as well as interactive media may be included. Other page data may be provided, including interactive text (e.g., Dynamic HTML) and interactive illustrations, such as "click to play" images or other visual data using, for example, script orchestration, Flash, Java applets, SVG, or Shockwave. Buttons may be provided for interface, such as those typically used with script orchestration and DHTML, as well as hyperlinks and forms for providing further interaction with the server (e.g., 220) and server-side databases. Furthermore, it should be understood by those skilled in the art that, while the present disclosure makes references to a "page", "application", etc., these references are intended to be synonymous for the purposes of domains, text-scaling and context, discussed in greater detail below.

The scaling module 216 may be configured to automatically load scaling data (e.g., via profile module 214) and/or receive manual input (e.g., via peripheral device(s) 201). In some illustrative embodiment, scaling module may additionally process and store page data corresponding to the scaling data, where the page data may comprise data relating to each domain of the page, as well as data relating to at least one domain relative to another. The processing of the scaling data together with the domain data may be defined as the overall "context" of the scaled text under the present disclosure. For example, the scaling module 216 may generate/receive text scaling data and store this data for future rendering. Also, scaling module 216 may store domain data (also referred to as domain characteristics) associated with the text scaling data that may include, but is not limited to, (e.g., images, video, etc.) in the domain, and so on. Together, this data provides a context for the text scaling for subsequent rendering. Further details are provided below in connection with FIGS. 8-9.

In some illustrative embodiments, profile module 214 and scaling module 216 may be incorporated into memory/data storage 206 with or without a secure memory area, or may be a dedicated component, or incorporated into the processor 210. Of course, processing device 202 may include other or additional components, such as those commonly found in a digital apparatus and/or computer (e.g., sensors, various input/output devices), in other embodiments. Additionally, in some embodiments, one or more of the illustrative components may be incorporated in, or otherwise form a portion of, another component. For example, the memory/data storage 206, or portions thereof, may be incorporated in the processor 210 in some embodiments.

The processor 210 may be embodied as any type of processor currently known or developed in the future and capable of performing the functions described herein. For example, the processor 210 may be embodied as a single or multi-core processor(s), digital signal processor, microcontroller, or other processor or processing/controlling circuit. Similarly, memory/data storage 206 may be embodied as any type of volatile or non-volatile memory or data storage currently known or developed in the future and capable of performing the functions described herein. In operation, memory/data storage 206 may store various data and software used during operation of the processing device 210 such as access permissions, access parameter data, operating systems, applications, programs, libraries, and drivers.

Memory/data storage 206 may be communicatively coupled to the processor 210 via an I/O subsystem 208, which may be embodied as circuitry and/or components to facilitate input/output operations with the processor 210, memory/data storage 206, and other components of the processing device 202. For example, the I/O subsystem 208 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 208 may form a portion of a system-on-a-chip (SoC) and be incorporated, along with the processor 210, memory/data storage 206, and other components of the processing device 202, on a single integrated circuit chip.

The processing device 202 includes communication circuitry 212 (communication interface) that may include any number of devices and circuitry for enabling communications between processing device 202 and one or more other external electronic devices and/or systems. Similarly, peripheral devices 204 may include any number of additional input/output devices, interface devices, and/or other peripheral devices. The peripheral devices 204 may also include a display, along with associated graphics circuitry and, in some embodiments, may further include a keyboard, a mouse, audio processing circuitry (including, e.g., amplification circuitry and one or more speakers), and/or other input/output devices, interface devices, and/or peripheral devices.

The server 220 may be embodied as any type of server (e.g., a web server, etc.) or similar computing device capable of performing the functions described herein. In the illustrative embodiment of FIG. 2 the server 220 includes a processor 228, an I/O subsystem 226, a memory/data storage 224, communication circuitry 232, and one or more peripheral devices 222. Components of the server 220 may be similar to the corresponding components of the processing device 202, the description of which is applicable to the corresponding components of server 220 and is not repeated herein for the purposes of brevity.

The communication circuitry 232 of the server 220 may include any number of devices and circuitry for enabling communications between the server 220 and the processing device 202. In some embodiments, the server 220 may also include one or more peripheral devices 222. Such peripheral devices 222 may include any number of additional input/output devices, interface devices, and/or other peripheral devices commonly associated with a server or computing device. In some illustrative embodiments, the server 220 also includes a context module 234 that is responsible for processing data from profile module 214 and scaling module 216 from device 202. This data may in real-time as it is entered on device 202, or may be batch processed and/or pushed or otherwise transmitted at predetermined intervals.

Context module 234 may also communicate with scaling manager module 230. In one illustrative embodiment, context module 234 processes the text scaling data and page data from scaling module 216 to provide a context value for each domain-specific text scaling performed on processor device 202. In one illustrative embodiment, the context value may comprise a plurality of values, where each value comprises characteristics of the scaled text to the page. In one example, the context value may comprise a text coverage value (e.g., 72 characters per line for a 560-pixel wide container). This value may also be represented on a pixel level, showing a percentage of text pixels compared to non-text pixels in a page container. In another example, the context value may represent the overall text location, relative to the domain (e.g., page container). It should be appreciated by those skilled in the art that there is a wide variety of possibilities for producing context values under the present disclosure, depending on the specific application.

In one example, a context value may comprise a plurality of values for a domain, where an arithmetic function is performed (e.g., multiplicative, additive, convolution, etc.) on at least two of the context values to produce a derived context value for the text scaling and domain. In another illustrative embodiment, a global context value may be calculated using at least one context value from each of a plurality of domains, where the global context value performs an arithmetic function on each of the domain context values to generate a global context value. In some illustrative embodiments, the derived context value and/or the global context value may serve as digital "fingerprints" to identify a particular text scaling for a domain and/or page. These digital fingerprints may also be stored in the scaling module and/or profile module 214 for subsequent processing for automatically loading domain-specific text scaling. Thus, in one example, if a user is loading an application for the first time in processing device 202, the processing device may load at least one of the derived context value and/or global context value from module 214 and/or 216 and compare the values to pre-stored values (e.g., in 206 and/or 224) representing specific text-scaling configurations. The values that are identical or most similar to the values (i.e., within a predetermined tolerance value) are then used to automatically load a page configuration for processing device 202 that comprises pre-stored domain-specific scaling data that represents a setting that is most similar to user setting preferences that may be stored in the profile module 214.

Scaling manager module 230 may be configured to assist and/or otherwise process data from context module 234, described above. In some illustrative embodiments, the scaling manager module 230 may provide domain-specific text scaling data to scaling module 216 for rendering on processing device 202. When configured on a computer network (e.g., 100), scaling manager module 230 may be tasked with managing and distributing domain-specific text scaling data for a plurality of devices (e.g., 102, 104). In some illustrative embodiments, the functions of context module 234 and scaling manager module 230 may be provided within device 202 to provide context module processing and scaling manager processing capabilities on processing device 202, without necessarily requiring a network connection.

In the illustrated embodiment, communication between the server 220 and the processing device 202 takes place via the network 106 that may be operatively coupled to one or more network switches (not shown). In one embodiment, the network 106 may represent a wired and/or wireless network and may be or include, for example, a local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). Generally, the communication circuitry of processing device 202 and the communication circuitry 232 of the server 220 may be configured to use any one or more, or combination, of communication protocols to communicate with each other such as, for example, a wired network communication protocol (e.g., TCP/IP), a wireless network communication protocol (e.g., Wi-Fi, WiMAX), a cellular communication protocol (e.g., Wideband Code Division Multiple Access (W-CDMA)), and/or other communication protocols. As such, the network 106 may include any number of additional devices, such as additional computers, routers, and switches, to facilitate communications between the processing device 202 and the server 220.

Figure 3:
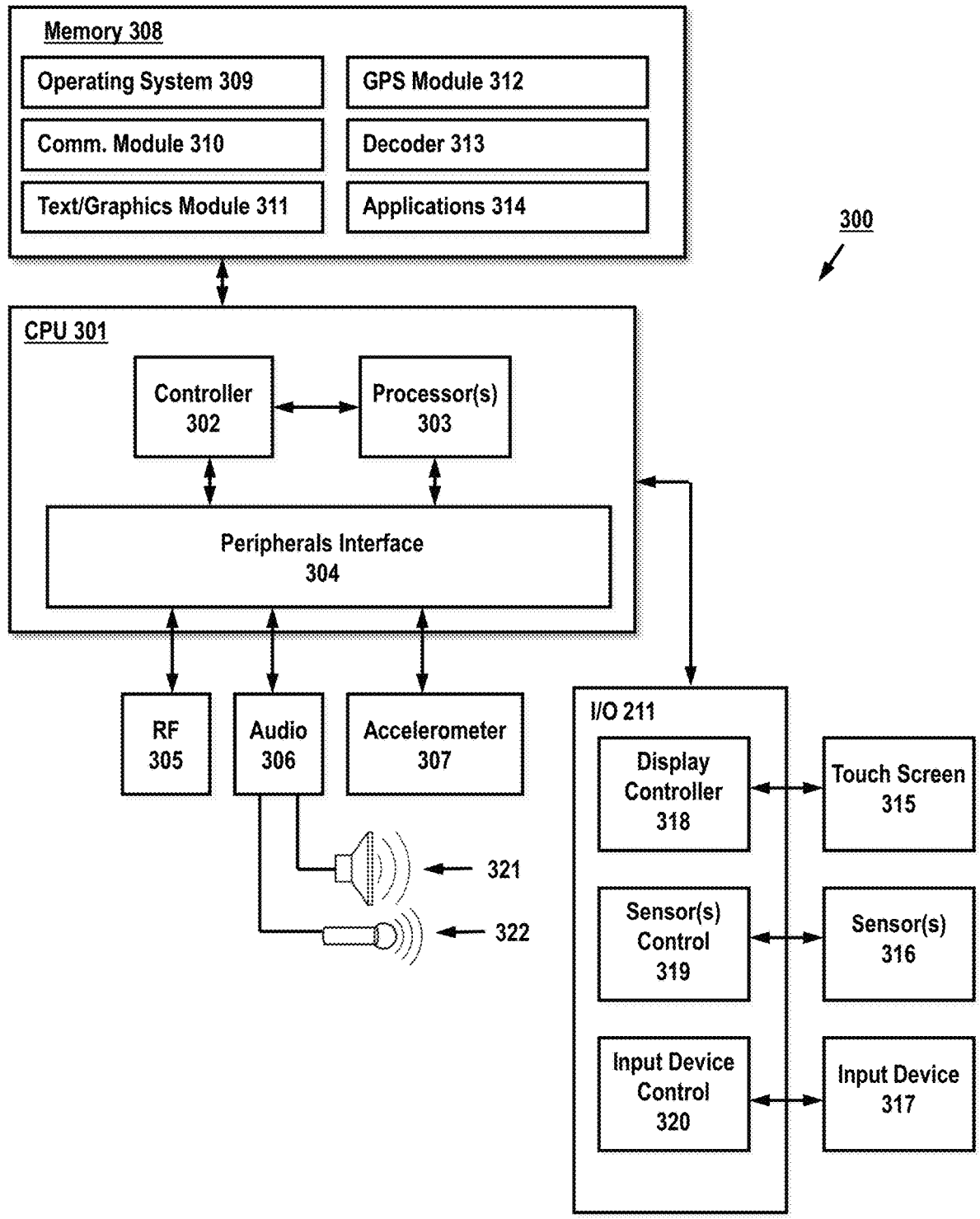
FIG. 3 schematically illustrates an operating environment for a processing device configured to perform domain-specific text scaling control under an illustrative embodiment.

FIG. 3 is an exemplary embodiment of a computing device 300 (such as processing devices 102, 104), and may be a personal computer, smart phone, tablet computer, laptop and the like. Device 300 may include a central processing unit (CPU) 301 (which may include one or more computer readable storage mediums), a memory controller 302, one or more processors 303, a peripherals interface 304, RF circuitry 305, audio circuitry 306, accelerometer 307, speaker 321, microphone 322, and input/output (I/O) subsystem 221 having display controller 318, control circuitry for one or more sensors 319 and input device control 320. These components may communicate over one or more communication buses or signal lines in device 300. It should be appreciated that device 300 is only one example of a portable multifunction device, and that device 300 may have more or fewer components than shown, may combine two or more components, or a may have a different configuration or arrangement of the components. The various components shown in FIG. 3 may be implemented in hardware or a combination of hardware and software, including one or more signal processing and/or application specific integrated circuits.

Memory (or storage) 308 may include high-speed random access memory (RAM) and may also include non-volatile memory, such as one or more magnetic disk storage devices, flash memory devices, or other non-volatile solid-state memory devices. Access to memory 308 by other components of the device 300, such as processor 303, and peripherals interface 304, may be controlled by the memory controller 302. Peripherals interface 304 couples the input and output peripherals of the device to the processor 303 and memory 308. The one or more processors 303 run or execute various software programs and/or sets of instructions stored in memory 308 to perform various functions for the device 300 and to process data. In some embodiments, the peripherals interface 304, processor(s) 303, decoder 313 and memory controller 302 may be implemented on a single chip, such as a chip 301. In other embodiments, they may be implemented on separate chips.

RF (radio frequency) circuitry 305 receives and sends RF signals, also known as electromagnetic signals. The RF circuitry 305 converts electrical signals to/from electromagnetic signals and communicates with communications networks and other communications devices via the electromagnetic signals. The RF circuitry 305 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 305 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

Audio circuitry 306, speaker 321, and microphone 322 provide an audio interface between a user and the device 300. Audio circuitry 306 may receive audio data from the peripherals interface 304, converts the audio data to an electrical signal, and transmits the electrical signal to speaker 321. The speaker 321 converts the electrical signal to human-audible sound waves. Audio circuitry 306 also receives electrical signals converted by the microphone 321 from sound waves, which may include utterances from a speaker. The audio circuitry 306 converts the electrical signal to audio data and transmits the audio data to the peripherals interface 304 for processing. Audio data may be retrieved from and/or transmitted to memory 308 and/or the RF circuitry 305 by peripherals interface 304. In some embodiments, audio circuitry 306 also includes a headset jack for providing an interface between the audio circuitry 306 and removable audio input/output peripherals, such as output-only headphones or a headset with both output (e.g., a headphone for one or both ears) and input (e.g., a microphone).

I/O subsystem 221 couples input/output peripherals on the device 300, such as touch screen 315, sensors 316 and other input/control devices 317, to the peripherals interface 304. The I/O subsystem 221 may include a display controller 318, sensor controllers 319, and one or more input controllers 320 for other input or control devices. The one or more input controllers 320 receive/send electrical signals from/to other input or control devices 317. The other input/control devices 317 may include physical buttons (e.g., push buttons, rocker buttons, etc.), dials, slider switches, joysticks, click wheels, and so forth. In some alternate embodiments, input controller(s) 320 may be coupled to any (or none) of the following: a keyboard, infrared port, USB port, and a pointer device such as a mouse, an up/down button for volume control of the speaker 321 and/or the microphone 322. Touch screen 315 may also be used to implement virtual or soft buttons and one or more soft keyboards.

Touch screen 315 provides an input interface and an output interface between the device and a user. Display controller 318 receives and/or sends electrical signals from/ to the touch screen 315. Touch screen 315 displays visual output to the user. The visual output may include graphics, text, icons, video, and any combination thereof. In some embodiments, some or all of the visual output may correspond to user-interface objects. Touch screen 315 has a touch-sensitive surface, sensor or set of sensors that accepts input from the user based on haptic and/or tactile contact. Touch screen 315 and display controller 318 (along with any associated modules and/or sets of instructions in memory 308) detect contact (and any movement or breaking of the contact) on the touch screen 315 and converts the detected contact into interaction with user-interface objects (e.g., one or more soft keys, icons, web pages or images) that are displayed on the touch screen. In an exemplary embodiment, a point of contact between a touch screen 315 and the user corresponds to a finger of the user. Touch screen 215 may use LCD (liquid crystal display) technology, or LPD (light emitting polymer display) technology, although other display technologies may be used in other embodiments. Touch screen 315 and display controller 318 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 315.

Device 300 may also include one or more sensors 316 such as heart rate sensors, touch sensors, optical sensors that comprise charge-coupled device (CCD) or complementary metal-oxide semiconductor (CMOS) phototransistors. The optical sensor may capture still images or video, where the sensor is operated in conjunction with touch screen display 315. Device 300 may also include one or more accelerometers 307, which may be operatively coupled to peripherals interface 304. Alternately, the accelerometer 307 may be coupled to an input controller 320 in the I/O subsystem 221. The accelerometer is preferably configured to output accelerometer data in the x, y, and z axes.

In some illustrative embodiments, the software components stored in memory 308 may include an operating system 309, a communication module 310, a text/graphics module 311, a Global Positioning System (GPS) module 312, decoder 313 and applications 314. Operating system 309 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components. Communication module 310 facilitates communication with other devices over one or more external ports and also includes various software components for handling data received by the RF circuitry 305. An external port (e.g., Universal Serial Bus (USB), Firewire, etc.) may be provided and adapted for coupling directly to other devices or indirectly over a network (e.g., the Internet, wireless LAN, etc.).

Text/graphics module 311 includes various known software components for rendering and displaying graphics on the touch screen 315, including components for changing the intensity of graphics that are displayed. As used herein, the term "graphics" includes any object that can be displayed to a user, including without limitation text, web pages, icons (such as user-interface objects including soft keys), digital images, videos, animations and the like. Additionally, soft keyboards may be provided for entering text in various applications requiring text input. GPS module 312 determines the location of the device and provides this information for use in various applications. Applications 314 may include various modules, including health monitoring software, sensor software, navigation software, mapping, address books/contact list, email, instant messaging, and the like.

Figure 4:
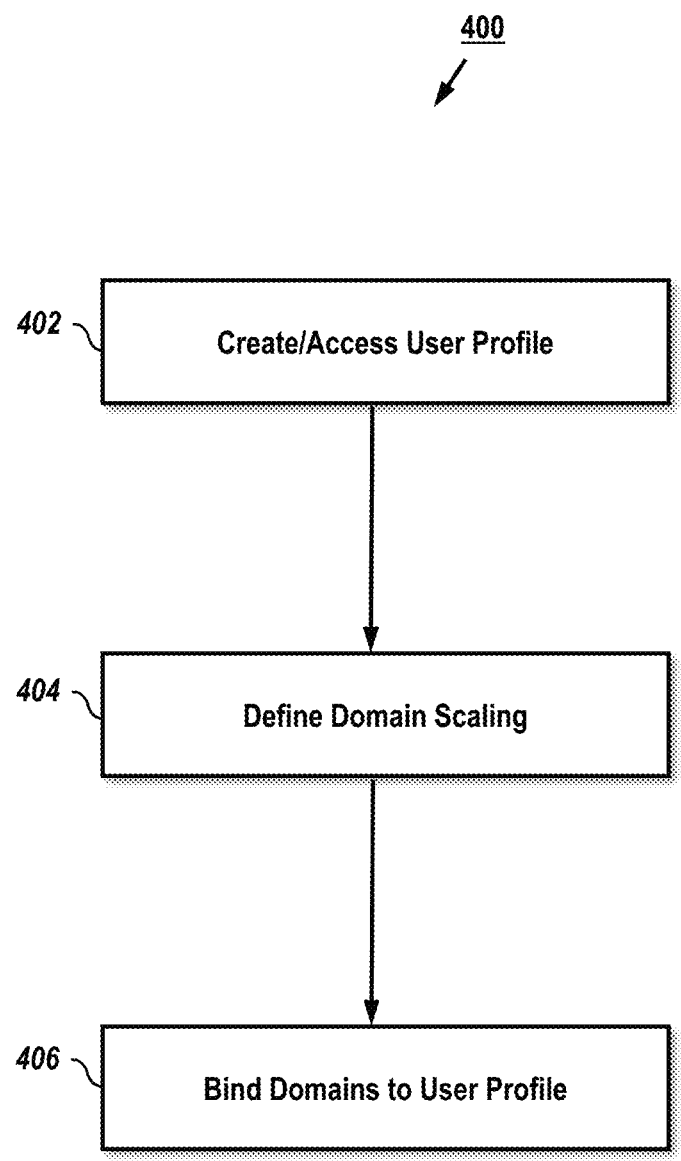
FIG. 4 shows a process for creating a user profile, defining domain scaling and binding the domains to the user profile under an illustrative embodiment.

Turning to FIG. 4, a simplified process 400 is shown for creating a user profile, defining domain scaling and binding (associating) the domains to the user profile under an illustrative embodiment. In this example, a user profile is created in block 402. The user profile may include, but is not limited to, user data relating to user identification, application/page history (e.g., applications/pages previous accessed by user), application/page configuration data, domain configuration data for each application/page, and domain-specific text scaling history. In block 404, the processing device (e.g., 202, 300) may define domain scaling for the device. As discussed above, the domain scaling may include domain-specific text scaling data that may be manually entered and/or automatically loaded from the user profile. In block 406, the processing device (e.g., 202, 300) may bind each of the domain-specific text scaling data to the user profile. In some illustrative embodiments, the binding may include context data associated with the domain-specific text scaling data. The binded data may then be saved to the user profile initially created in block 402. In some illustrative embodiments, each time a user accesses an application/page, the process of FIG. 4 may continue to update a user's domain-specific text scaling data as it is changed and/or updated, and bind the changes and updates to the user profile. Eventually, the process will develop a baseline text-scaling setting for domains and/or pages. In this example, the processing device (e.g., 202, 300) may be configured to automatically load the baseline text-scaling setting when the user accesses a new application/page.

Figure 5:
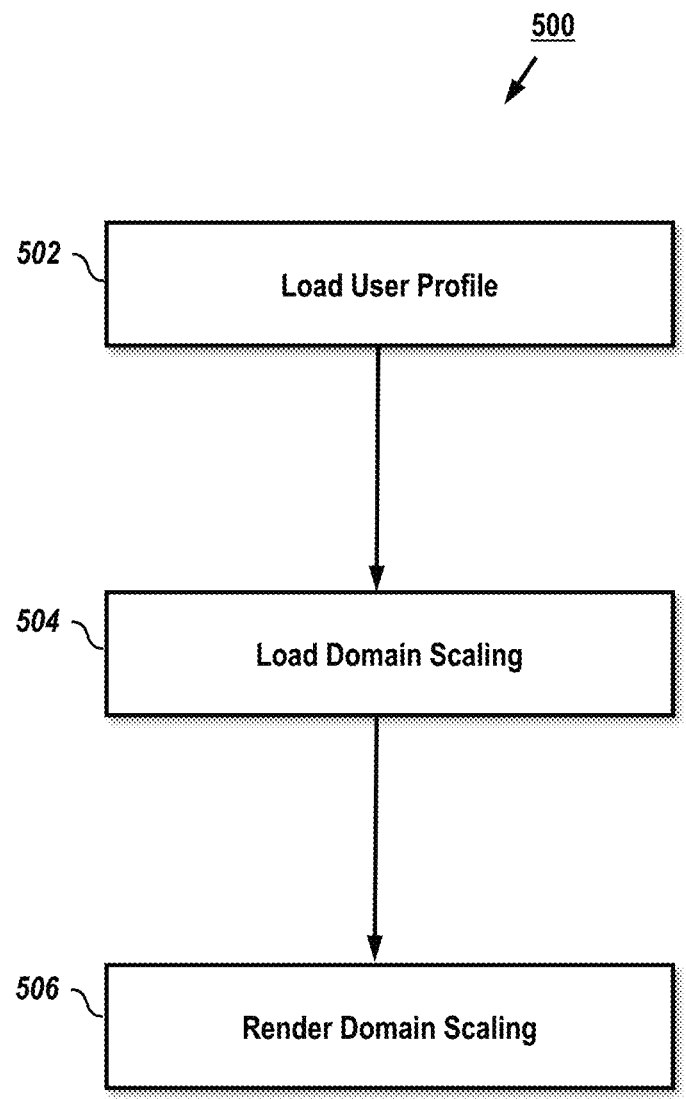
FIG. 5 shows a process loading user profiles and domain scaling data in order to automatically render a scaled domain under an illustrative embodiment.

FIG. 5 shows a process 500 for loading user profiles and domain scaling data in order to automatically render a scaled domain under an illustrative embodiment. Here, the user profile is loaded in block 502. The loaded profile may include any of the data described above, and particularly the data described in FIG. 4. Also, the profile is preferably loaded at the time a user logs into a system, and prior to the moment an application/page is executed/accessed by the user. In some illustrative embodiments, the loaded user profile may also include the domain/page data, the domain-specific text scaling data, and/or context data. In block 504, the processing device (e.g., 202, 300) loads the domain scaling data that includes the domain-specific text scaling data. The loading of the domain scaling data preferably occurs at the time the user of the processing device executes/accesses an application/page.

In one example, a user may be given the option to load pre-stored or processing device-generated text scaling data prior to executing/accessing an application/page. In another example, the user manually enters the domain-specific text scaling data, which gets loaded in block 504. Once the domain-specific text scaling is loaded, the processing device (e.g., 202, 300) renders the domain scaling for each domain in block 506. The rendering of domain scaling in block 506 may be configured such that each domain of an application/page has text scaling that is independent of other domains. One of the advantages of the present disclosure is that the text scaling of one domain does not affect the text scaling of other domains in an illustrative embodiment. In some illustrative embodiments, a plurality of domains may be linked together and designated as "primary" and "secondary" domains. In this example, text scaling in a primary domain would automatically transfer to all secondary domains linked to the primary domain.

Figure 6:
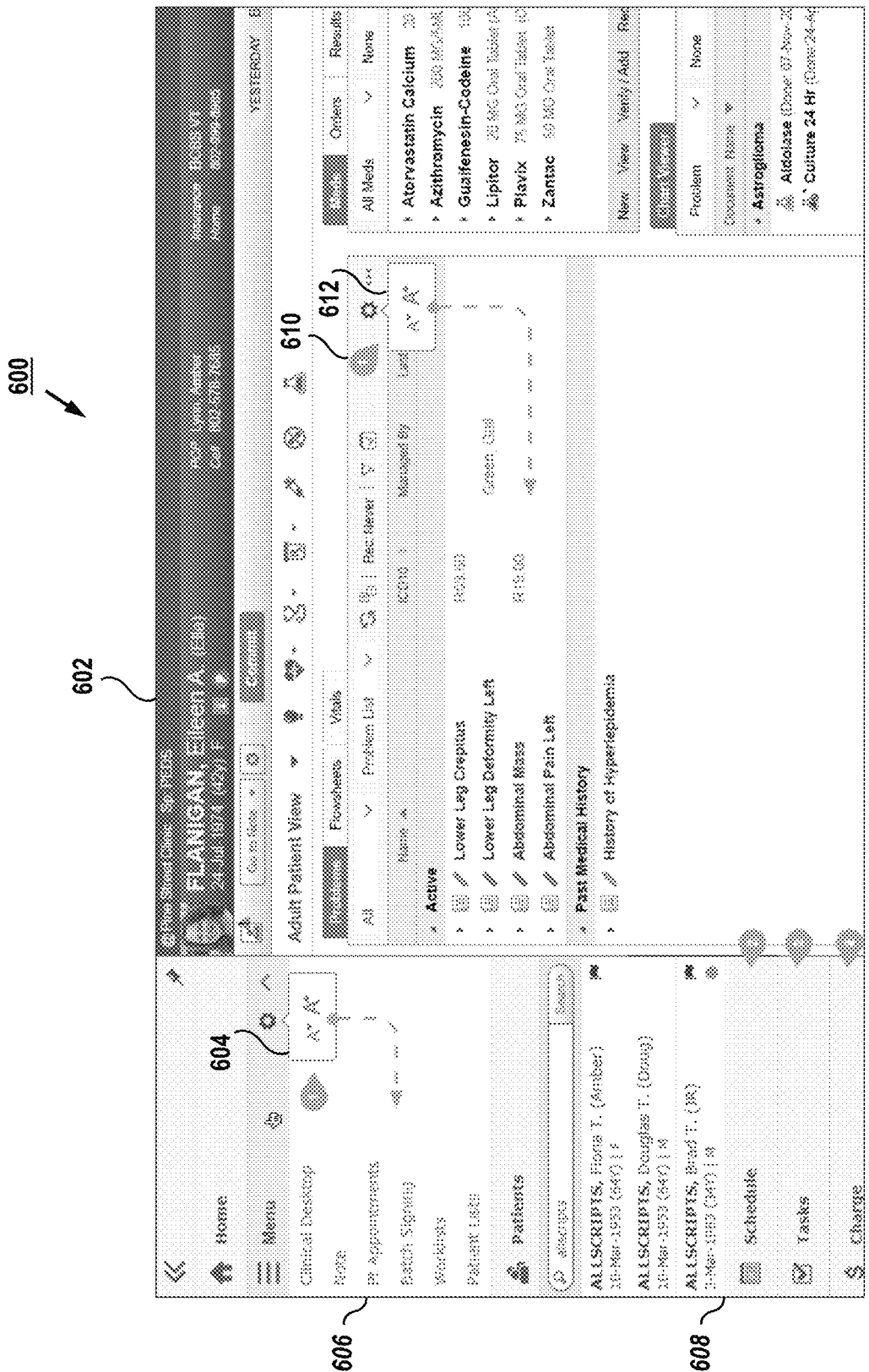
FIG. 6 shows a simulated screenshot of a user interface for allowing a user to set domain-specific text scaling under an illustrative embodiment.

FIG. 6 shows a simulated screenshot 600 of a user interface for allowing a user to set domain-specific text scaling under an illustrative embodiment. In this example, the processing device (e.g., 202, 300) executes a page 600 that comprises a plurality of domains (606, 608, 610). In domain 606, a text scaling option is provided in the form of an interface 604 that allows the user to enter data manually, via a keyboard, mouse, touchscreen, or the like. Using the interface 604, the user may increase or decrease the text scaling for domain 606. The text scaling may be based on any suitable unit (e.g., ems, pixels, points, percent). In some illustrative embodiments, the interface 604 that allows for the entry of text scaling data for domain 606 may also be configured to affect text scaling for other domains (e.g., 608) that are linked to the domain of the interface (e.g., 604). Similarly, using the interface 612, the user may increase or decrease the text scaling for domain 610. In some illustrative embodiments, the interface 612 that allows for the entry of text scaling data for domain 610 may also be configured to affect text scaling for other domains (e.g., 608) that are linked to the domain of the interface (e.g., 612).

Figure 7:
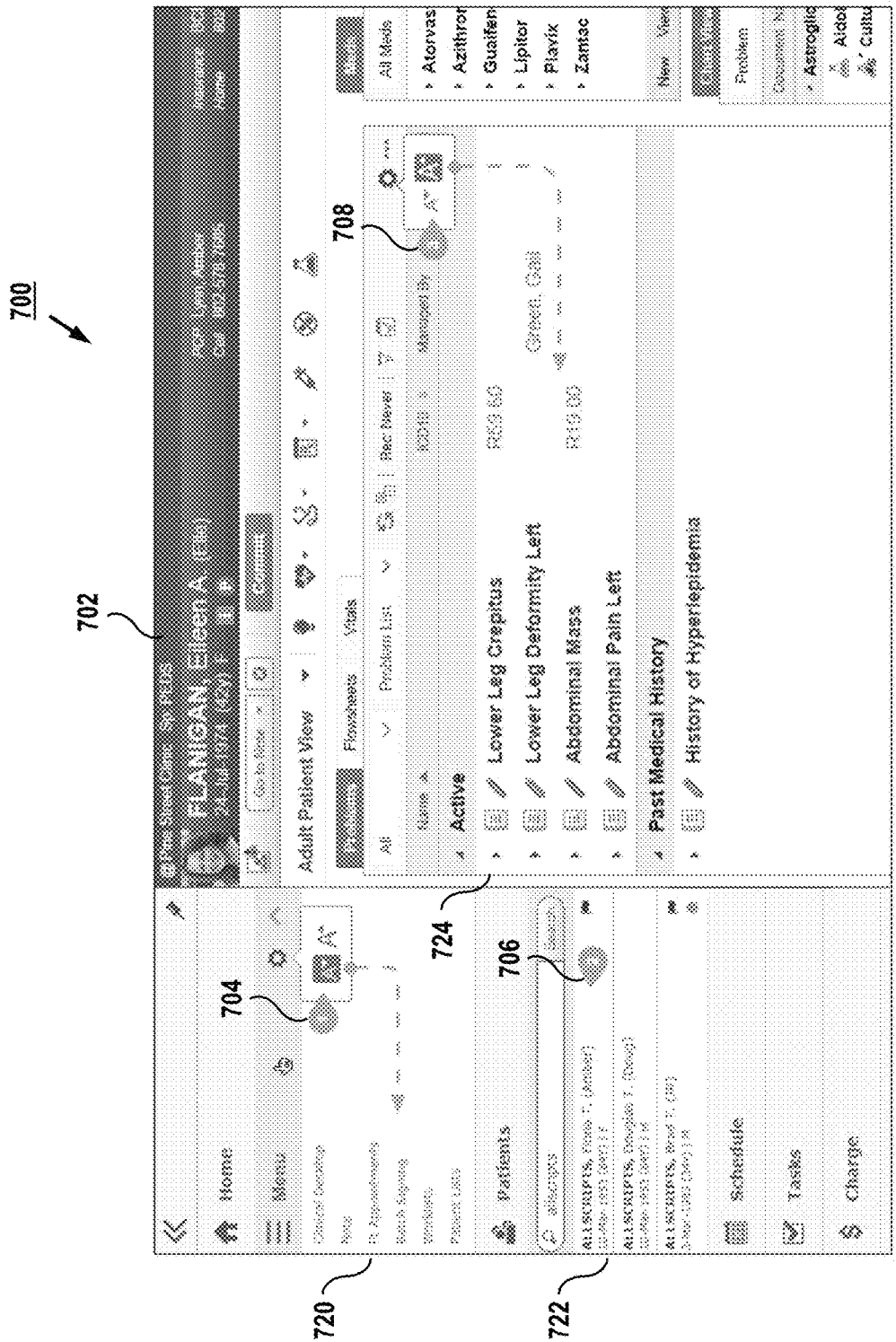
FIG. 7 shows a simulated screenshot of a user interface being executed by a user to set domain-specific text scaling under an illustrative embodiment.

FIG. 7 shows a simulated screenshot 700 of a user interface being executed by a user to set domain-specific text scaling under an illustrative embodiment. In this example, the figure shows the interface 704 being activated by a user to scale down (i.e., make smaller) the text using the menu domain 720. In this example, the scaled down text 706 of domain 722 is executed by the processor (e.g., 210, 301). Here, the menu domain 720 is configured such that any domain-specific text scaling is executed only in other domains (e.g., 722). Of course, the example of FIG. 7 may be configured such that the menu domain 720 may also be changed by the text scaling. Similarly, interface 708 is shown in the example as being activated by a user to scale up (i.e., make larger) the text for the "Problems" tab in domain 724. In some illustrative embodiments, the domain-specific text scaling may affect all tabs (or "sub-domains") if a domain, or may be configured only to specifically affect the active tab during use of the interface.

Figure 8:
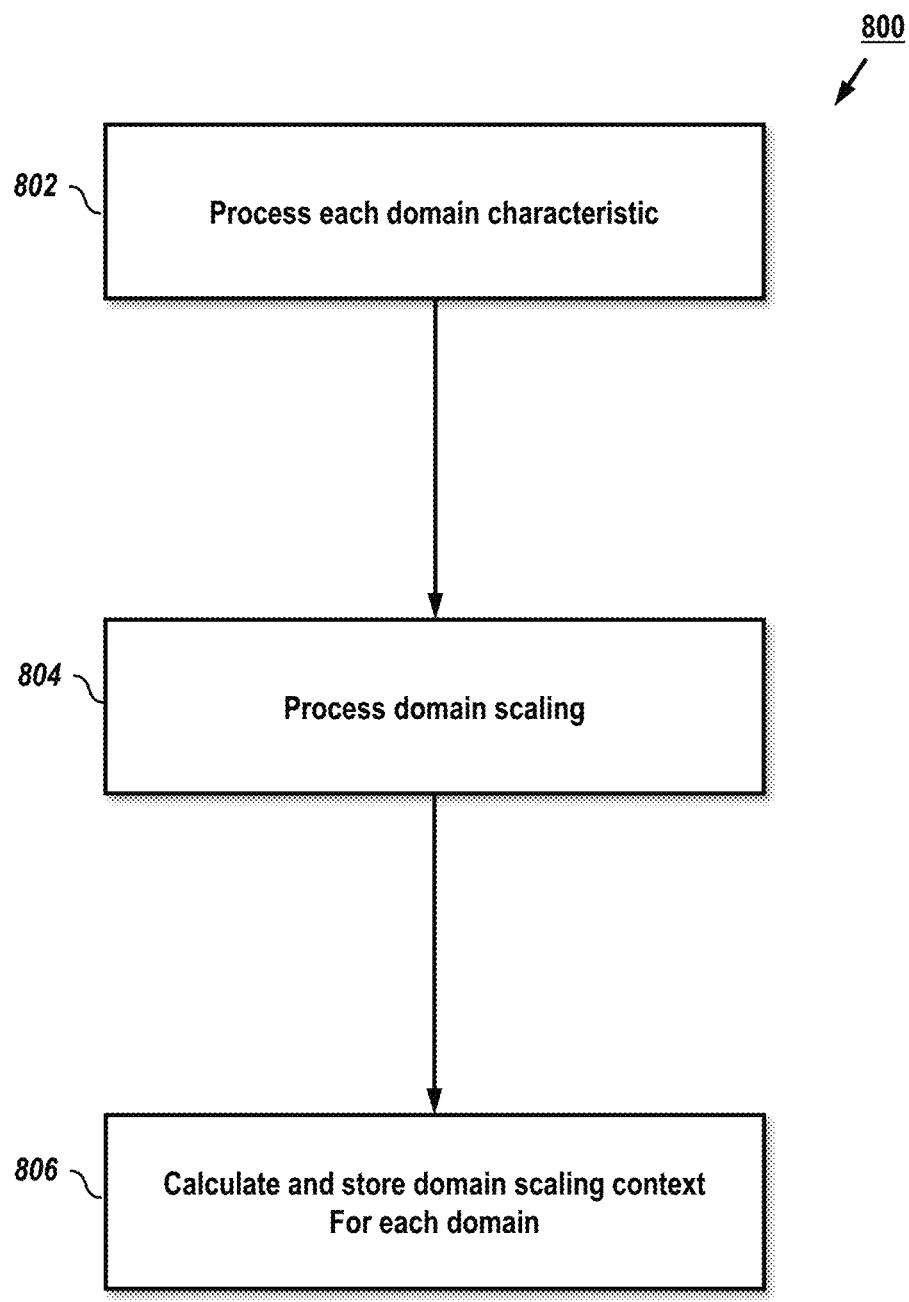
FIG. 8 shows a simplified process for processing domain characteristic and scaling in order to generate domain scaling context for each domain.

FIG. 8 shows a simplified process 800 for processing domain characteristic and scaling in order to generate domain scaling context for each domain. As discussed in greater detail above, in box 802, the processing device (e.g., 202, 300) processes each domain characteristic for an active (i.e., in the process of being executed) application/page. In block 804, the processing device processes the domain scaling to determine domain characteristics, including domain characteristics relative to the scaled text. In block 806, the processing device calculates and stores domain scaling context for each domain in the application/page.

Figure 9:
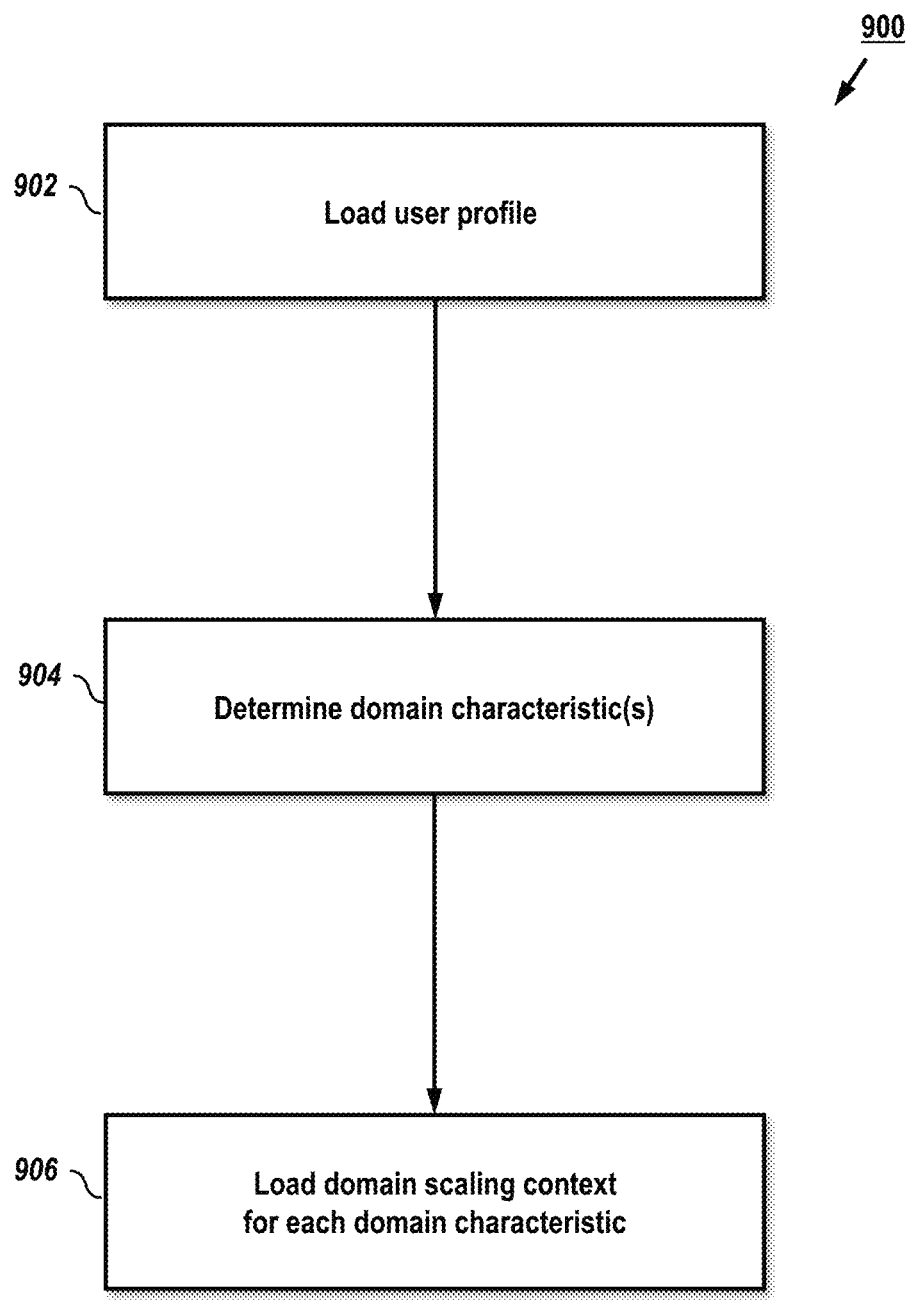
FIG. 9 shows a simplified process for loading a user profile and determining domain characteristics in order to automatically load domain scaling contexts for each domain characteristic under an illustrative embodiment.

FIG. 9 shows a simplified process 900 for loading a user profile (e.g., from 214) and determining domain characteristics in order to automatically load domain scaling contexts for each domain characteristic under an illustrative embodiment. Once a processing device (e.g., 202, 300) is activated, the processing device may load a user profile into memory (e.g., 206, 308) in block 902. In block 904, the processing device may determine one or more domain characteristics for an application/page that is loaded and/or executed. Once the one or more domain characteristics are determined, the processing device loads a domain scaling context for each domain characteristic. Under the example of FIG. 9, an application/page that is being loaded for the first time (or, one that does not have previous characteristic data and/or context data loaded) may automatically determine the domain characteristics and load a scaling context that provides domain-specific text scaling for a user based on preferences determined from previous domain-specific text scaling indicated by the user (e.g., via interface 612, 614).

Those skilled in the art will appreciate that the present disclosure provides an elegant and efficient way to allow users to define text scaling that is domain-specific, so that, for example, a text scaling change in one domain on a page will not affect the text scaling on another domain on the same page. Alternately and/or in addition, the system may process and analyze domain characteristics relative to the text scaling to provide a context that may later be used to automatically load domain-specific text scaling for a user of a processing device, based on previous settings provided by that user.

The figures and descriptions provided herein may have been simplified to illustrate aspects that are relevant for a clear understanding of the herein described devices, structures, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The disclosed embodiments may be implemented, in some cases, in hardware, firmware, software, or any tangibly-embodied combination thereof. The disclosed embodiments may also be implemented as instructions carried by or stored on one or more non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus for providing domain-specific text scaling for a page comprising a plurality of domains, comprising:
   a processing apparatus configured to generate the page comprising the plurality of domains, wherein the processing apparatus is further configured to generate an interface associated with at least one of the plurality of domains and wherein the processing device is configured to process at least one of the plurality of domains to determine a domain context comprising domain characteristic data and text scaling;
   a memory device, operatively coupled to the processing apparatus;
   communications circuitry, operatively coupled to the processing apparatus, wherein the communications circuitry is configured to communicate with a computer network;
   a profile module, operatively coupled to the processing apparatus, wherein the profile module is configured to store user identification information and user context information comprising domain characteristic data and domain-specific text scaling data associated with the domain context;
   a scaling module, operatively coupled to the processing apparatus, wherein the processing apparatus is configured to process the user context information to generate a first context value, process the generated page to determine a second context value for at least one domain of the page, compare the second context value with the first context value, and, if the values match within a predetermined tolerance value, load a predetermined text scaling value for the domain associated with the second context value for modifying the text scale.

2. The apparatus of claim 1, wherein the processing apparatus is configured to determine the domain context by processing domain characteristic data relative to the text scaling.

3. The apparatus of claim 2, wherein the domain characteristic data comprises at least one of domain size, presence/size of images in the domain, presence/location of borders within the domain, and relative position of text to the borders and/or other elements in the domain.

4. The apparatus of claim 1, wherein the processing apparatus is configured to modify the text scaling by increasing or decreasing the size of the font in the domain.

5. The apparatus of claim 1, wherein the page comprises one of an application page or a web page.

6. A processor-based method for providing domain-specific text scaling for a page comprising a plurality of domains, comprising:
   generating, via a processing apparatus, the page comprising the plurality of domains;
   processing, via the processing apparatus, at least one of the plurality of domains to determine a domain context comprising domain characteristic data and text scaling;
   generating, via the processing apparatus, an interface associated with at least one of the plurality of domains;
   storing, via a profile module, user identification information and user context information comprising domain characteristic data and domain-specific text scaling data;
   associating, via the processing apparatus, the domain context with the user identification information and storing the associated domain context in the profile module;
   receiving an input via the generated interface;
   processing the user context information to generate a first context value;
   processing the generated page to determine a second context value for at least one domain of the page;
   comparing the second context value with the first context value, and, if the values match within a predetermined tolerance value, loading a predetermined text scaling value for the domain associated with the second context value for modifying the text scale.

7. The method of claim 6, wherein processing at least one of the plurality of domains to determine a domain context comprises processing domain characteristic data relative to the text scaling.

8. The method of claim 7, wherein the domain characteristic data comprises at least one of domain size, presence/size of images in the domain, presence/location of borders within the domain, and relative position of text to the borders and/or other elements in the domain.

9. The method of claim 6, wherein modifying the text scaling comprises increasing or decreasing the size of the font in the domain.

10. The method of claim 6, wherein the page comprises one of an application page or a web page.

11. An apparatus for providing domain-specific text scaling for a page comprising a plurality of domains, comprising:
    a processing apparatus configured to generate the page comprising the plurality of domains;
    a memory device, operatively coupled to the processing apparatus;
    communications circuitry, operatively coupled to the processing apparatus, wherein the communications circuitry is configured to communicate with a computer network;
    a profile module, operatively coupled to the processing apparatus, wherein the profile module is configured to store user identification information and user context information comprising domain characteristic data and domain-specific text scaling data;
    a scaling module, operatively coupled to the processing apparatus,
    wherein the processing apparatus is configured to
        process the user context information to generate a first context value;
        process the generated page to determine a second context value for at least one domain of the page;
        compare the second context value with the first context value, and, if the values match within a predetermined tolerance value, load a predetermined text scaling value for the domain associated with the second context value for modifying the text scale.

12. The apparatus of claim 11, wherein the domain characteristic data comprises at least one of domain size, presence/size of images in the domain, presence/location of borders within the domain, and relative position of text to the borders and/or other elements in the domain.

13. The apparatus of claim 11, wherein the loaded text scaling causes the processing apparatus to increase or decrease the font of the text in the domain associated with the second context value.

14. The apparatus of claim 11, wherein the page comprises one of an application page or a web page.

15. The apparatus of claim 11, wherein the processing apparatus is configured to process the user context information to generate a first context value by applying an arithmetic function to domain characteristics.

16. The apparatus of claim 11, wherein the processing apparatus is configured to process the generated page to determine a second context value by applying an arithmetic function to domain characteristics.

* * * * *